United States Patent [19]

Iseli

[11] Patent Number: 5,092,202
[45] Date of Patent: Mar. 3, 1992

[54] APPARATUS AND METHOD FOR THE PRODUCTION OF CUTTER TOOLS

[75] Inventor: Benno Iseli, Schotz, Switzerland

[73] Assignee: Iseli & Co. AG, Schotz, Switzerland

[21] Appl. No.: 517,932

[22] Filed: May 2, 1990

[30] Foreign Application Priority Data

May 2, 1989 [GB] United Kingdom ................. 8910022

[51] Int. Cl.$^5$ ............................................. B23D 63/00
[52] U.S. Cl. ........................................ 76/25.1; 76/112
[58] Field of Search ........... 76/25.1, 112, 80, DIG. 11, 76/101.1

[56] References Cited

U.S. PATENT DOCUMENTS

| 3,034,378 | 5/1962 | Anderson . | |
| 3,295,396 | 1/1967 | Kolb | 76/25.1 |
| 4,949,599 | 8/1990 | Iseli | 76/112 |

Primary Examiner—Roscoe V. Parker
Attorney, Agent, or Firm—Locke Reynolds

[57] ABSTRACT

Apparatus for securing hard material tips to the teeth of a cutter tool includes a carrier unit for presenting an end of a rod of the tip forming material to a tooth to be tipped, a spring for exerting pressure between the tip forming material and the tooth to be tipped during a welding operation such that the end can be welded to the tooth with the tip forming length positioned with respect to the tooth at substantially the rake angle for the tip. Following the welding operation the rod or bar is severed from the end thereof attached to the blade tooth in such manner that the cut surface defines the top face of the tip.

The carrier unit brings the lower end of the bar into contact with the tooth that is located at the welding station to hold the lower end in place during the welding operation. The tooth is heated to such a temperature that the tooth melts in the immediate vicinity of the location where the tip is to be located and secured in place so that the bar end is pushed into the molten tooth metal to form a seating notch. Since the pressure being exerted upon the tip forming length is always maintained by the spring use can be made of the position of the carrier unit to determine the degree of penetration of the tip forming length into the tooth. A combined limit stop and switch unit is provided for setting the depth of penetration and also for stopping the welding process as soon as the required degree of tip length penetration has been attained.

14 Claims, 1 Drawing Sheet

APPARATUS AND METHOD FOR THE PRODUCTION OF CUTTER TOOLS

FIELD OF THE INVENTION

This invention relates to apparatus for and methods of forming cutter tools having teeth with hard material tips. In particular, the present invention is concerned with the production of saw blades whose teeth are tipped with a material that is harder than the material of the body of the blade.

BACKGROUND OF THE INVENTION

The tipping of saw blade teeth is well known and various machines have been proposed for the tipping of circular, band, gang and/or the like saws. In addition, various materials have been proposed for use as the tips. Also, various proposals have been made as to the nature and form of the materials from which the tips are produced. For example, it has been proposed to pre-cut or otherwise provide short pieces or elements of the tip forming material, each of sufficient length as to be correspond to a single tip element, and to provide apparatus in which these single tip forming elements are successively fed from a supply, magazine or store thereof to a brazing or welding work station at which the tip forming elements are secured by brazing, welding or the like to the next tooth of a blade whose teeth are required to be tipped.

It is additionally known to provide apparatus which utilizes, rather than single tip length elements as the supply of tip forming material, bars or rods of the material from which a number of tip forming lengths can be successively cut at the time of attaching individual tips to the teeth of a blade that is to be tipped. With such known arrangements one end of the supply bar or rod is presented, in a direction from the side of the blade, to the tooth to be tipped. This end is attached to the tooth to be tipped by, for example, a combination of heat and pressure in which the one end of the bar or rod is effectively so pushed against a tooth, that has been heated sufficiently to melt a portion of the tooth, with sufficient force as to produce a notch in the heated tooth into which is received said bar or rod one end. After allowing the tooth to cool, the tip material material is firmly attached to the tooth by the combined effects of the heat and pressure. After the attachment of bar or rod end, the bar or rod is cut to leave the requisite length (i.e., a tip length) of tip forming material secured to the tooth.

Following this operation blade is indexed in such manner that the next tooth to be tipped is moved to the tipping work station and the portion of the rod or bar that is to provide the next tip length is presented to the tooth next to be tipped. In other words, the tip forming pieces or elements are successively removed as required from an end of the supply rod or bar.

In practice, this sideways feed of the bar or rod end has been found, over many years, to involve inherent shortcomings in relating to economic tipping of the various forms of saw blades.

Furthermore, various materials have been proposed as tip forming materials such as Tungsten carbide and the material known under the trade name Stellite. The present invention, while being particularly concerned with the use of Stellite bars or rods as the tooth tipping material, is not restricted to the use of such materials as other suitable materials could be used so that the concepts of the invention are not specifically restricted to the use of Stellite.

It will be appreciated, from the forgoing, that during the application of the tip forming material to a blade tooth, it is necessary to ensure that the tip forming material is correctly positioned with respect to the tooth to be tipped, and that the tipping material is firmly held in the required setting relative to the tooth to be tipped throughout the tipping processes. It will be further understood that at the end of a tipping operation it is necessary to be able to index a blade being tipped so that the next tooth to be tipped is moved into the tip attachment work station of the apparatus.

In practice, the arrangements provided for feeding the tip forming material to a tip and those required for the actual tip attachment must not impede the indexing of the blade and its firm retention in the indexed position while the tip forming material is being secured to the blade tooth.

It is therefore an object of the present invention to provide apparatus for facilitating the tipping of saw blades. In particular, the present invention is concerned with apparatus for the tipping of saw blade teeth which avoids any sideways feed and which still makes use of a rod or bar of the tip forming material from which tip forming lengths are removed as and when a tooth is required to be tipped.

SUMMARY OF THE INVENTION

Broadly, according to a first aspect of the invention, a method of tipping a cutter tool tooth with a hard material tip includes providing a bar or rod from which a succession of tip forming lengths may be obtained, presenting an end of the bar or rod of the tip forming material to a tooth to be tipped at substantially the rake or face angle for the tip when the tip forming material is mounted to the tooth, securing the bar or rod end to the tooth, and removing the unrequired remainder of the bar or rod. Preferably, the removal of said remainder is effected by cutting the bar in such manner that the cut surface of the tip lies substantially at the requisite top face relief angle for the tip.

In accordance with a second aspect of the invention, the bar or rod from which tip forming lengths are to be removed is positioned by a carrier unit. The carrier unit is displaceable between a first position and a second position. At the first position the bar or rod end is located in a tip attachment station of a saw tipping apparatus, the tooth being position in a tip attachment location, in which a tip forming length can be secured to a tooth of a tool having a plurality of teeth to be tipped. At the second position the carrier unit and bar or rod end is remote from the attachment station and the carrier unit is located away from the region through which the tool passes during displacement of the tool to present the next tooth to be tipped to the tip attachment location. Preferably, the carrier unit is arranged to be pivotable between the two positions.

Conveniently, the bar or rod is mounted in the carrier unit in such manner that the rod or bar is displaceable with respect to the carrier unit to feed the rod or bar such that an end of the bar or rod can be presented to the next tooth to be tipped. Conveniently, the feeding of the bar or rod is arranged to be effected during the displacement of the carrier unit from the second position to the first position, the feeding arrangement being such that on the return to the first setting a required length of tip forming material is available for the commencement of a tip to tooth attachment operation.

In a preferred arrangement the displacement of the rod or bar carrier unit is synchronized with the operation of arrangements for indexing or feeding the next tooth to be tipped to the welding station.

In accordance with a further aspect of the invention there is provided apparatus for applying hard material tips to the teeth of a cutter tool having a plurality of teeth comprising carrier means for feedwise mounting a bar or rod from which a succession of tip forming lengths may be obtained, means for enabling presentation of an end of the bar or rod of the tip forming material to a tooth to be tipped at substantially the rake or face angle for the tip when the latter is mounted to the tooth, means for securing the end to the tooth, and means for removing the unrequired remainder of the bar or rod. Preferably, the removal of said remainder is effected by means of a cutting tool positioned for cutting the bar in such manner that the cut surface of the tip lies substantially at the requisite face relief angle for the tip.

Various features and advantages of the invention will become apparent to those skilled in the art upon consideration of the following detailed description of a preferred embodiment exemplifying the best mode of carrying out the invention as presently perceived. The detailed description particularly refers to the accompanying drawing.

BRIEF DESCRIPTION OF THE DRAWING

The Figure is a schematic representation of an embodiment of an apparatus incorporating the concepts of the invention.

DESCRIPTION OF THE PREFERRED EMBODIMENT

Figure 1:
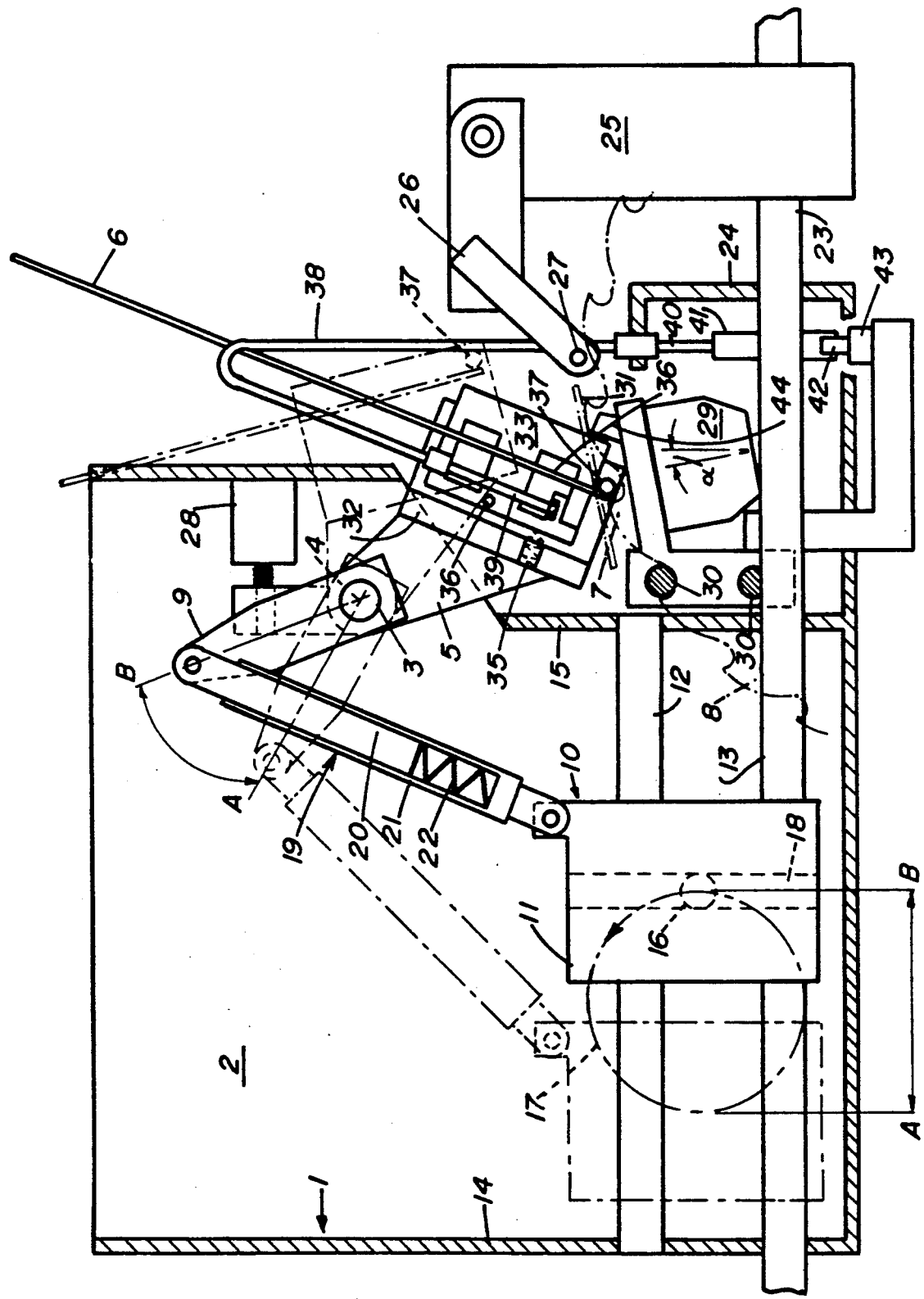

Referring now to the drawing, the apparatus shown in the Figure schematically illustrates that portion of the apparatus for applying hard material tips to the teeth of a saw blade which is concerned with the supply of the tip forming material and its attachment to a blade tooth. It will be understood that in a practical apparatus means will be provided; for the supply of electric current for enabling the actual welding operations involved with the attachment of a tip to a tooth when in the tipping work station of the apparatus; means for mounting and guiding the blade to be tipped so that the teeth thereof can be successively indexed to the tipping work station; means for locking the blade in an indexed setting; means for providing support frames and like constructions for mounting the drives and controls for the various components of the apparatus in their requisite operational locations, and means providing control systems for inter-relating the operation of the various components of the apparatus. Although such means are not illustrated, the incorporation of such means in a conventional manner is to be understood.

Since the present invention is essentially concerned with the feed of the material used for the formation and attachment of tips to the teeth of a cutter tool such as a circular, band, gang and/or other form of saw blade, a detailed description of the parts and components of apparatus and machines not directly concerned with the tip material feed and attachment is not required, as it is merely conventional.

Furthermore, in so far as the drawing illustrates in a generally schematic form the particular apparatus of the invention, it is convenient to note that the Figure indicates two operational settings of the apparatus, the first, in full lines, representing the situation when the apparatus is operationally set for a blade tooth tipping operation, and the second, in dashed-dotted lines, representing the essentials of the situation when the apparatus of the invention is set for blade feed or blade indexing.

The apparatus of the invention includes a housing or framework 1 which, in practice, is supported at a required working height by a main frame or the like (not shown). Only a fragmentary portion of the housing or framework 1 is illustrated in the Figure. The housing or framework 1, inter alia, includes a support plate 2 or the like for a shaft 3 rotatable about its longitudinal axis 4.

Externally of the housing 1, the shaft 3 mounts to a combined electrical welding head and carrier unit 5, for a rod or bar 6 of Stellite or other suitable material which is to provide the tips for the teeth 7 of a blade 8 of which only a small fragment is shown, in phantom. The carrier unit is constrained to rotate with the shaft 3 such that the rotation of the shaft 3 swings the carrier unit about a horizontal axis.

The blade 8 can be a band saw, circular saw, gang or other form of saw. Depending upon the nature of the saw to be tipped the apparatus will be provided with suitable guide and support arrangements related to the form of the blade to be tipped. For convenience, in the Figure, the blade has been shown in dot-dashed lines as being a part of a circular saw blade since it is believed that this affords a better visual representation of position of blade during the tipping operations to be discussed.

The carrier unit 5 is pivotable between a first position or setting, shown in full lines, at which an end of the bar or rod of tip forming material is moved into a blade tipping station in which the end is presented to and can be secured to the blade next tooth 7 to be tipped i.e., by electrical welding, and a second position or setting, shown in dashed dotted lines, in which the bar or rod has been positionally removed to a location in which it cannot impede movements of the blade 8 while it is fed or indexed to bring the next tooth 7 to be tipped into the blade tipping station.

A lever 9 (located within the housing 1) is secured to the shaft 3 whereby tilting of the lever 9 will correspondingly rotate the shaft 3 about the axis 4 and in so doing will also pivot i.e, correspondingly tilt, the carrier unit 5 about the axis 4 of the shaft 3. The extent of tilt is indicated by the arrow A-B and the full, and chain-dot outlines of the lever 9.

The tilting of the lever 9 in either direction A-B or B-A is effected by a drive system 10 (located within the housing 1) including a block 11 slidably mounted on suitable guides represented by an upper guide rod 12 (located within the housing) for reciprocatory movement at right angles to the longitudinal axis 4 of the shaft 3. The block 11 is connected with a lower slide rod 13. The guide rod 12 is shorter than the rod 13 and is fixedly mounted in vertical support elements 14 and 15 connecting with the housing or framework 1 of the apparatus.

The block 11 is intended to be reciprocated, between limit positions shown as A and B in the Figure, lengthwise of the upper rod 12 by the engagement of a pin 16, carried by a rotatable member schematically indicated by a circular arrow 17, in a slot 18 provided in the block. The axis of rotation of the rotatable member 17 is parallel to that of the shaft 3. The member 17 is located within the housing 1.

The block 11 is coupled to the lever 9 through a two part connection 19 including telescopically interengaging section 20 and 21 resiliently loaded with respect to each other by a compression spring 22, the resilient loading being such that the carrier unit and thus the tipping material bar or rod are pressure loaded towards the full line position shown in the Figure. The spring 22 makes it possible for the drive arrangement to accommodate the 'lost motion' that occurs when the block 11 is located at either of its end positions A or B. As will be understood, at these positions the block is being brought to rest at the end of one direction of movement to be followed by the initiation of the movement in the reverse direction.

The lower rod 13 projects in both directions from the support elements 14 and 15. The rod 13 is axially slidable with respect to the support elements 14 and 15. One end portion 23 of the lower rod 13 is additionally slidably mounted in a further support element 24 associated with the housing or framework 1.

The slide block 11 is secured to the bar 13 so that displacement of the slide block 11, lengthwise of the bar 12, also displaces the bar 13. Thus, as the block 11 reciprocates relative to the bar 12, and thus the housing 1, the bar 13 is caused simultaneously to undergo corresponding reciprocatory movements.

The end portion 23 of the rod 13 rod carries a unit 25 for indexing, i.e. feeding, the saw blade whose teeth 7 to be tipped with respect to the welding station. Briefly, this indexing unit 25 incorporates an arm 26 carrying an indexing pin 27 which is selectively positionally settable so as to be able to engage into the gullet regions between successive teeth of a blade whether circular, band or gang. The unit 25 is, in practice, positioned so as not to impede any movement of the saw blade. The arrangement of the unit is such that the pin 27 is able to intercept the blade to engage with a tooth when it is required to index the blade in such manner that an operational stroke of the unit 26 correctly advances a teeth to the tipping station.

To accommodate various blade sizes and forms, the arm 26 and pin 27 are so relatively dimensioned and selectively relatively settable that the extent of indexing movement produced can by adjusted to suit the nature of, and dimensions i.e., tooth pitch and blade size and form, of a blade, and thus to be able correctly to engage with the successive teeth of a blade to be tipped. In practice, this can be achieved by adjustment of the relative angular setting of the arm 26 relative to the remainder of the unit 25, and the extent to which the arm projects from the remainder of the unit.

With the arrangement as so far discussed it will be understood that, as the indexing arrangement is effectively mounted from the lower rod, the operation of the indexing arrangement is accurately synchronized with the movements of the reciprocating block 11 between the limit positions A and B. Furthermore, since the movement of the block 11 controls the movement of the pivoted arm 9, it also controls the pivotal movement of the bar or rod carrier unit 5 in such manner that when the block 11 is moving to its second position, indicated by the letter 'A', the lever 9 is pivoted anti-clockwise to Pivot the carrier unit 5 away from the full line first position and to the retracted setting. At the same time, the indexing unit 25 is automatically operated to advance the indexing arm 26 and its pin 27 to engage with a saw blade tooth gullet and thus index the next tooth to be tipped to its tipping position. When the block is displaced from the position 'A' to the position 'B' the indexing unit 25 is displaced so as to withdraw the pin 27 from engagement with a tooth gullet, and, at the same time, the lever 9 is moved from its position 'A' to its position 'B' indicated in the Figure. It will be clear from the Figure that the corresponding positions of the carrier unit 5 and the block 11 have similarly been identified as A and B.

From the above description it follows that as the block 11 reciprocates between its first and second positions 'A' and 'B' the lever 9 pivots between its corresponding positions 'A' and 'B' and in so doing alternately lowers and raises the carrier unit 5 to and from the tip welding position while at the same time controlling the indexing of the blade to be tipped.

It will be understood that blade clamping arrangements are provided to clamp the blade following indexing and during tip welding, and to allow blade movement during indexing. Such clamping can be electromagnetically effected by involving suitable switches responsive to the instantaneous position of the block 11. As has been indicated, the function of the carrier unit 5 is to bring the lower end of the Stellite bar or rod 6 into contact with the tooth 7 to be tipped that is located at the welding or attachment station and to hold the lower end in place during the welding operation. At the same time, since the mode of welding used involves heating the Stellite and the tip tooth to such a temperature that the tooth melts in the immediate vicinity of the location where the tip is to be located and secured in place, the tipping Stellite bar or rod end is required to be pushed into the molten tooth metal to form a seating notch. That is the tip material has to be pressed towards the main body of the tooth 7 with sufficient force for the tip forming length to deflect the adjacent molten tooth material to form a seating notch into which at least the lower regions of the tipping material can nest.

As previously indicated, this pressure is produced by the resilient loading exerted by the spring 22 upon the inner member 20 of the connection 19, the pressure being transmitted through the lever 9 to the carrier unit 5 and thus to the Stellite bar or rod end being secured to the tooth. Since the pressure being exerted upon the tip forming length is always maintained by the spring 22, use can be made of the position of the carrier unit 5 to determine the degree of penetration of the tip forming length into the tooth 7.

For this purpose, a combined limit stop and switch unit 28 is provided for setting the depth of penetration and also for stopping the welding process i.e., switching OFF the welding supplies as soon as the required degree of tip length penetration has been attained, and the Stellite tip has been accurately positioned for correct welding into place. In the case of fully automatic control arrangements (not shown) which can be, for example, electrical or hydraulic or combined systems, the arrangements would initiate operation of a cutting wheel assembly 29 immediately following the stopping of the welding process.

This cutting wheel assembly 29, is mounted upon support guides 30 in such manner that the assembly can be advanced between a cutting position and a retracted position in and out of the plane of the Figure. In so far as the Figure is concerned, the cutting wheel is located to the reverse side of the blade. In this connection it is useful to note that the carrier unit 5 is effectively positioned in advance of the blade, and such that the bar or rod is located precisely above the blade to be tipped. The assembly 29 incorporates a cutting wheel 31, i.e., Borazon; diamond, etc., which is arranged at such an angle with respect to the remainder of the apparatus, and thus the portion of the Stellite bar or rod that has been welded to the blade tooth 7, that it can be caused to sever the main part of the rod or bar 6 from the tip forming length thereof that has been welded to the blade tooth 7, at such angle with respect to the length direction of the tip as to produce the top relief angle from the tip. An important practical feature arises from severing the bar or rod in this manner is that any burr build-up of the material of the blade tooth arising from the welding process is cut-away so that, after the severing of the bar or rod, none of such build-up material stands above of the actual tip top face. This reduces the amount of post tipping grinding and represents a significant economic advance in saw blade production.

In the Figure this top relief angle has been indicated by the angle $\alpha$. This angle, in practice, will be adjustable to accommodate differing top relief angle requirements. For clarity, the arrangements provided for adjustment of this angle are not shown.

Once the cutting operation has been completed the control arrangements are arranged to retract the cutting assembly 29 back to its initial or rest position. Typically, in a manually operated apparatus, the retraction of the cutting assembly would be effected manually. In an automatically operated apparatus, the completion and/or progress of the retracting movements of the cutter assembly can be used to initiate various control functions and, in particular, the initiation of the drive to the rotatable member 17 to return the latter to its carrier unit retracted position B. It will be appreciated chat such control circuitry would involve, in the case of automatic operation, timing arrangements for control of factors such as the duration of the welding processes, the rate of blade indexing, etc. The control of such would desirably be so as to attain optimum values for the tipping and blade materials involved. While it has been indicated above that fully automatic arrangements can be used, the various operations can by manually controlled, if desired, or partly manually and partly automatically controlled.

In addition, the construction and operation of the carrier unit 5 is such that that a predetermined length of the Stellite bar or rod can be always presented to a tooth to be tipped. In general this is achieved by arranging that, during the movement of the carrier unit from its position B to the position A, the Stellite rod is enabled to move downwardly with respect to the carrier unit to expose a new tip forming length at the lower end of the bar or rod. This movement can be conveniently a mechanical feed or a gravity feed, and in the apparatus schematically shown in the Figure gravity feed is utilized.

In addition, arrangements can and, in practice, would be provided for setting the length of the tip attached to the blade tooth according to the length of tip required from any particular tooth. An embodiment of the Stellite handling features of the carrier unit 5 will now be considered in more detail.

The carrier unit 5 can conveniently be regarded as a form a part of the welding head, including part of the electrical circuitry of the apparatus. For this reason the mounting for carrier unit 5 will involve suitable electrical insulation (not shown). The unit includes a main body 32 connected to the lever 9, a member 33 pivoted to the body 32. The member 33 is resiliently loaded in an anti-clockwise direction by a spring 35. The member 33 carries a pair of clamping jaws 36, or the like, which are so mounted that they are bodily displaceable lengthwise of the member 33 between the limits indicated by the letters 'C' and 'D'. The jaws 36 are used to clamp against and support the Stellite bar or rod 6. An abutment 37 is provided upon the carrier arm main body, which abutment serves to push against the tip forming length during the welding operation to ensure the welding pressure is maintained.

The outer sleeve of a Bowden type cable 38 is connected between the member 33 and the support element 24 of the housing 1. One end 39 of the inner displaceable coupling wire of the cable 38 is connected to the member 33 while the other end 40 of this inner wire is connected to a support member 41 having a follower wheel 42 engaging with a ramp surface 43. The connection between the support member 41 and the associated end 40 of the inner wire involves a compression spring (not shown) which acts as to push the follower wheel 42 in a downwardly direction. In other words, the spring loading on the inner wire of the cable 38 is such as to pull the inner wire end 39 and thus the jaws 36 towards the position 'D'. The ramp surface 43 is arranged to be displaced towards and away from the connector 41 during the advance and retraction of the cutting assembly 29.

A stop means 44 is so position that when the carrier unit 5 is at the welding position the member 39 is pushed against the spring loading thereof and in so doing opens the jaws. In practice, the jaws 36 (together with guide means, not shown, if considered necessary) serve to support and position the Stellite rod in a required position with respect to the carrier unit.

The interrelationship between the main body 32 and the member 33 are such that when the carrier unit 5 has been advanced towards the welding station, the abutment element 37 on the lower end of the member 33 is pushed by the stop 44 against the spring loading of spring 35 and causes the jaws to open. When the jaws are thus opened the Stellite rod is able to move automatically downwardly under the action of gravity to expose requisite bar or rod length that is to provide the next tip to be attached to a tooth.

As previously mentioned the completion of the cutting assembly retraction initiates a new cycle of operations. It will be appreciated that as soon as the carrier unit 5 commences its return to the position A the unit 33 will be returned to the position shown in the Figure by the spring 35 thereby gripping the Stellite bar or rod so that the latter moves with the carrier unit 5.

A feature of the tips produced by the apparatus of the invention is that the so-called welding slack is not produced as the Stellite bar or rod is severed at the top clearance angle. It is preferred to use as the tipping material Stellite bars or rods which have been Preferred in accordance with the teaching of the Applicant's European Patent Application No. 89302781.3. and U.S. Pat. No. 4,949,599.

I claim:

1. Apparatus for facilitating the tipping of saw blades, the apparatus including a tip attachment station, indexing means for indexing a saw blade whose teeth are to be tipped through said station, a carrier unit for a bar of tip forming material from which tip forming lengths are to be successively removed, means for mounting the carrier unit for displacement between a first position at which a tip forming length can be secured to a tooth of a saw blade, the tooth being positioned at the tip attachment station, and a second position in which the carrier unit is located away from the region through which the teeth of the blade pass during the indexing thereof to present the next tooth to be tipped to the tip attachment station, attaching means for attaching a tip forming length of the tip forming material to each tooth when the carrier unit is in the first position, and cutting means for cutting the bar of tip forming material subsequent to its attachment to the saw blade in such manner that the cut surface of the tip lies substantially at the requisite top face relief angle for the tip.

2. The apparatus of claim 1 further comprising a base, a first member reciprocally driven with respect to the base, guide means fixed to the base and engaging the first member for defining a path of reciprocal travel for the first member, and means for coupling said indexing means to said first member for reciprocal movement therewith.

3. The apparatus of claim 2 wherein said indexing means comprises a first unit fixed to said first member for reciprocal movement therewith, an arm having a first end coupled to the first unit, and an indexing pin fixed to a second end of the arm for contacting said blade, the arm being selectively adjustable to suit the nature and dimensions of the blade.

4. The apparatus of claim 2 wherein said carrier unit further comprises a lever pivotally connected to the base for arcuate displacement about an axis, a first end of the lever carrying said bar of tip forming material, and connecting means for connecting a second end of the lever to said first member for reciprocal movement therewith.

5. The apparatus of claim 4 wherein said connecting means comprises a first element connected to the second end of the lever, a second element connected to said first member, the first and second elements being telescopically interengaging with respect to each other.

6. The apparatus of claim 5 wherein said connecting means further comprises spring means situated between the first and second elements for resiliently loading said carrier unit such that the bar of tip forming material is pressured loaded towards a tooth of the saw blade.

7. The apparatus of claim 2 further comprising a second guide means fixed to the base generally orthogonal to the first guide means and means for moving said cutting means along said second guide means to cut said bar of tip forming material prior to movement of said indexing means.

8. The apparatus of claim 2 further comprising clamping means for clamping the blade to prevent movement thereof while the carrier unit positions the tip forming material in contact with a tooth of the blade.

9. The apparatus of claim 8 wherein said clamping means comprises an electromagnetic clamp and switch means responsive to the position of said first member.

10. The apparatus of claim 2 wherein said attaching means comprises a switch unit including a limit stop for limiting the depth of penetration of the tip forming material into the blade tooth during the attaching of the tip to the tooth.

11. Apparatus for attaching tips formed from a supply of hard tip forming material to teeth of a saw blade comprising: a base, a first member reciprocally driven with respect to the base, guide means fixed to the base and engaging the first member for defining a path of reciprocal travel for the first member, an indexing unit including means for periodically moving said saw blade to a new tooth application position, the indexing unit being coupled to said first member for reciprocal movement therewith, a lever pivotally connected to the base for arcuate displacemant about an axis, a first end of the lever carrying said supply of tip forming material between a first position in contact with a tooth of the saw blade and a second position remote therefrom, connecting means for connecting a second end of the lever to the first member for reciprocal movement therewith, attaching means for attaching a tip forming length of the tip forming material to each tooth when the lever is in the first position, and cutting means for cutting a tooth tip applied to said saw blade from said supply of tip forming material in such manner that the cut surface of the tip lies substantially at the requisite top face relief angle of the tip.

12. The apparatus of claim 11 wherein said indexing unit comprises a first unit fixed to said first member for reciprocal movement therewith, an arm having a first end coupled to the first unit, and an indexing pin fixed to a second end of the arm for contacting said blade, the arm being selectively adjustable to suit the nature and dimensions of the blade.

13. The apparatus of claim 11 wherein said connecting means comprises a first element connected to the second end of the lever, a second element connected to said first member, the first and second elements being telescopically interengaging with respect to each other, and spring means situated between the first and second elements for resiliently loading said lever in said first position such that the supply of tip forming material is biased towards a tooth of the saw blade.

14. The apparatus of claim 11 wherein said attaching means comprises a switch unit including a limit stop for limiting the depth of penetration of the tip forming material into the lade tooth during the attaching of the tip to the tooth.

* * * * *